(12) United States Patent
Yeh et al.

(10) Patent No.: US 7,799,160 B2
(45) Date of Patent: Sep. 21, 2010

(54) METHOD FOR MANUFACTURING COMPOSITE CONTAINER WITH DIFFERENT OPENING SIZES

(75) Inventors: Sheng-Hsiung Yeh, Longtan Township, Taoyuan County (TW); Wen-Lung Wang, Longtan Township, Taoyuan County (TW); Jui-Hua Wan, Longtan Township, Taoyuan County (TW); Hsien-Jung Chiu, Longtan Township, Taoyuan County (TW); Dar-Ping Juang, Longtan Township, Taoyuan County (TW); Guang-Shyang Ger, Longtan Township, Taoyuan County (TW); Cheng-Huan Wang, Longtan Township, Taoyuan County (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 424 days.

(21) Appl. No.: 11/826,212

(22) Filed: Jul. 13, 2007

(65) Prior Publication Data

US 2009/0014114 A1    Jan. 15, 2009

(51) Int. Cl.
*B65H 81/00*     (2006.01)
(52) U.S. Cl. .................. 156/169; 156/171; 156/172; 156/173; 156/174; 156/175

(58) Field of Classification Search .................. 156/169, 156/171, 172, 173, 175, 174
See application file for complete search history.

(56) References Cited

U.S. PATENT DOCUMENTS

| 5,273,603 | A | * | 12/1993 | Park et al. | .................. | 156/175 |
| 5,348,698 | A | * | 9/1994 | Park et al. | .................. | 264/154 |
| 6,361,635 | B1 | * | 3/2002 | Ayorinde | .................. | 156/169 |

* cited by examiner

*Primary Examiner*—Jeff H Aftergut
(74) *Attorney, Agent, or Firm*—Rosenberg, Klein & Lee

(57) ABSTRACT

The present invention relates to a method for manufacturing a composite container with different opening sizes, which is accomplished by winding with fibers impregnated with resin. First, fibers impregnated with resin are wound on a first substrate for winding a first container, wherein first openings are positioned at both ends of the first container. Then, cut the first container into two shells with a first opening each, and slip one of the shells on a second substrate. Next, fibers impregnated with resin is used for winding the second substrate and the shell such that the fibers impregnated with resin wound on the second substrate and the shell are combined to form a second container, where both ends of the second container are the first opening and a second opening with different opening sizes. Thereby, filament winding can be applied for manufacturing containers with different opening sizes on both ends, and the technique of manufacturing and performance of containers are enhanced.

14 Claims, 6 Drawing Sheets

METHOD FOR MANUFACTURING COMPOSITE CONTAINER WITH DIFFERENT OPENING SIZES

FIELD OF THE INVENTION

The present invention relates generally to a manufacturing method, and particularly to a method for manufacturing a composite container with different opening sizes.

BACKGROUND OF THE INVENTION

Modern composite materials are applied extensively in manufacturing. The manufacturing methods of composite materials include spray-up, resin transfer molding (RTM), and filament winding, wherein spray-up and RTM rely on handiwork, and thereby the repeatability of product characteristics is poor.

Filament winding is winding molds with fibers impregnated with resin for manufacturing hollow tubes or containers. The applications thereof include diving oxygen cylinders and fuel storage containers for automobiles. Because composite materials have superior characteristics to metal materials in specific strength, anti-corrosion capability, formability, and cost, for most containers accommodating liquid or gas, better durability is attained. Thereby, in the present day, the method for manufacturing most containers is filament winding of composite materials. The method uses fibers impregnated with resin to wind a container mold core for forming a container. The composite materials used for winding the container are fibers impregnated in advance with resin before winding is performed. Alternatively, fibers first pass through a resin trough for impregnating with resin right before winding is performed.

Presently, products usually manufactured using filament winding are pressure containers, such as oxygen cylinders and fuel containers. The filament winding according to the prior art uses fibers to wind one side of a mold core for forming a tube or a container with identical opening sizes on both ends. Thereby, it can be applied to a filament-winding machine with automatic controls for mass-producing tubes or containers. Current filament winding has better production efficiency, simpler processes, and less sophisticated specifications. However, it is because of the simple processes and standardization, current filament winding cannot control precisely the winding angles of fibers. Consequently, current filament winding can only calculate and control a single winding angle of fibers on mold cores for fabricating composite containers with identical opening sizes on both ends but cannot fabricate composite containers with distinct opening sizes on both ends. In order to fabricate composite containers with distinct opening sizes on both ends, other manufacturing methods, such as spray-up and RTM, have to be applied. Nevertheless, the costs of said manufacturing methods are higher than the cost of filament winding. In addition, the production efficiencies of said manufacturing methods are lower than that of filament winding.

Therefore, how to find a method which can not only solve the limitation of composite materials in manufacturing unequal openings containers but also upgrade the mass production capabilities has been our long term goal. The novel manufacturing method according to the present invention can fabricate filament wound containers with arbitrary unequal openings.

SUMMARY

An objective of the present invention is to provide a method for manufacturing a composite container with different opening sizes, which slips a shell with a first opening on a substrate, and then winds the substrate and the shell with fibers for producing a container with different opening sizes.

Another objective of the present invention is to provide a method for manufacturing a composite container with different opening sizes, which uses a first substrate and a second substrate with different opening sizes to control first fibers and second fibers for forming composite shells with different sizes. Thereby, the first and the second fibers can wind in collocation to form a container with different opening sizes.

The present invention relates to a method for manufacturing a composite container with different opening sizes, which winds with first fibers impregnated with resin to form a first container. The first container is then cut into two shells. One of which shells is slipped on a second substrate. Next, use second fibers impregnated with resin to wind the second substrate and thus form a second container with different opening sizes on both ends. Firstly, the first substrate is installed. The winding pattern of the first fibers impregnated with resin is determined according to the shape of the first substrate. Afterwards, wind the outer side of the first substrate with the first fibers impregnated with resin for forming the first container. On both ends of the first container are first openings with identical opening sizes. Cut the first container into shells with the first openings. Then, the second substrate is installed. The winding pattern of the second fibers impregnated with resin is determined according to the shape of the second substrate. Afterwards, wind the outer side of the second substrate, together with the shell, with the second fibers impregnated with resin for forming the second container. On both ends of the second container are the first opening and a second opening with distinct opening sizes. A container with distinct opening sizes on both ends can thereby be mass-produced by filament winding. Accordingly, the production efficiency of containers with distinct opening sizes on both ends can be enhanced and the costs thereof can be reduced.

In order to make the structure and characteristics as well as the effectiveness of the present invention to be further understood and recognized, the detailed description of the present invention is provided as follows along with preferred embodiments and accompanying figures.

DETAILED DESCRIPTION

The present invention relates to a method for manufacturing a composite container with different opening sizes, which uses filament winding for manufacturing a container with distinct opening sizes. According to the present invention, filament winding can be adopted for manufacturing a container with distinct opening sizes with enhanced production technology and efficiency. According to filament winding, fibers are impregnated in resin in advance to make pre-preg fibers then winding is performed. Alternatively, fibers first pass through a resin trough for impregnating with resin right before winding is performed. The impregnated or pre-preg fibers are wound on a substrate for forming the bulk or the shell of a container, wherein the material of the fibers can be chosen from the group consisting inorganic or organic fibers, such as glass fibers or carbon fibers, or a combination of the above. The impregnation resin is thermoplastic or thermosetting resin. Thereby, the method for manufacturing a composite container with different opening sizes according to the present invention can reduce effectively costs by means of filament winding technique.

Figure 1:
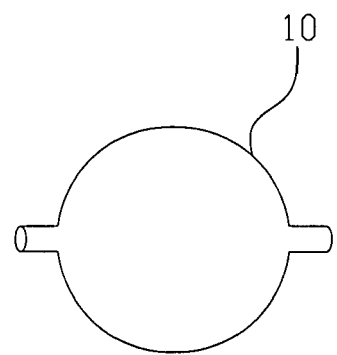
FIG. 1 shows a schematic diagram of an embodiment step according to a preferred embodiment of the present invention.
Figure 2:
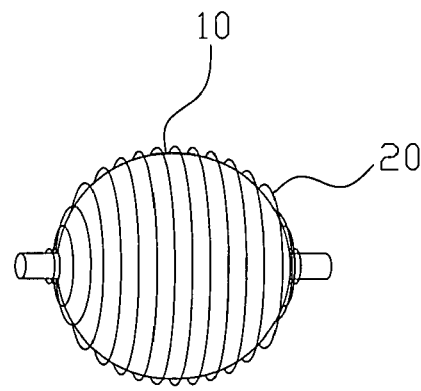
FIG. 2 shows a schematic diagram of an embodiment step according to a preferred embodiment of the present invention.
Figure 3:
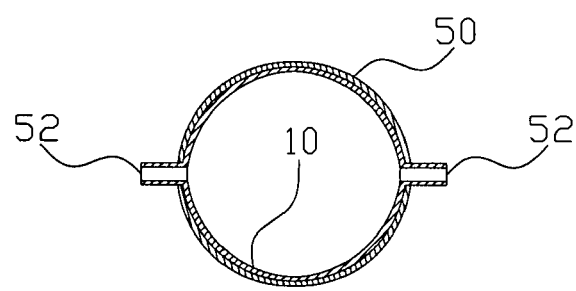
FIG. 3 shows a schematic diagram of an embodiment step according to a preferred embodiment of the present invention.

FIGS. 1 to 8 show schematic diagrams of embodiment steps according to a preferred embodiment of the present invention. As shown in the figures, the manufacturing method according to the present invention uses a filament-winding machine to manufacture a container with different opening sizes on both ends with first fibers impregnated with resin 20 for a first substrate 10, and second fibers impregnated with resin 40 for a second substrate 30, wherein the diameter of the opening of the first substrate 10 is smaller than that of the second substrate 30. As shown in FIG. 1, the first substrate 10 is installed onto the filament-winding machine. The winding pattern of the first fibers impregnated with resin 20 is determined according to the shape of the first substrate 10. As shown in FIG. 2, the first fibers impregnated with resin 20 are wound on the outer surface of the first substrate 10 to form a first container 50, wherein the first fibers impregnated with resin 20 are chosen from the group consisting inorganic or organic fibers, such as glass fibers or carbon fibers, or a combination of the above. The impregnation resin is thermoplastic or thermosetting resin. Then, cure the first container 50 and the cured first container 50 is shown in FIG. 3, wherein first openings 52 are positioned on both ends of the first container 50, respectively.

Figure 4:
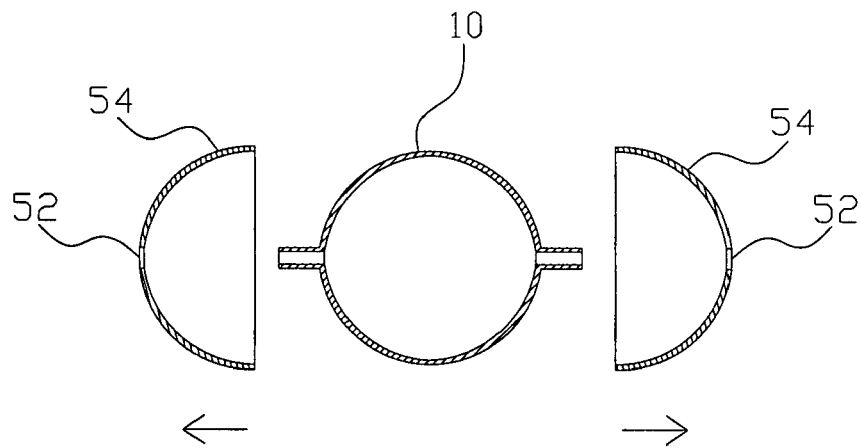
FIG. 4 shows a schematic diagram of an embodiment step according to a preferred embodiment of the present invention.
Figure 5:
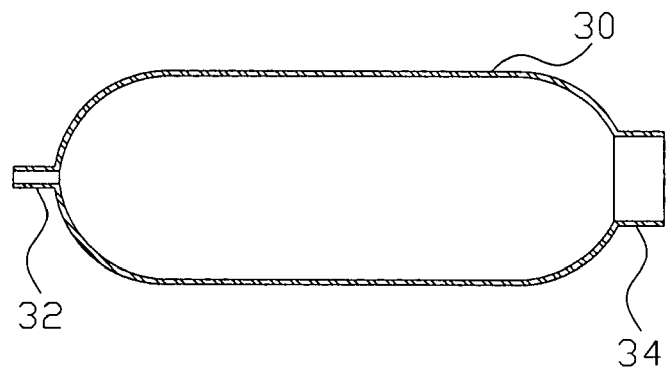
FIG. 5 shows a schematic diagram of an embodiment step according to a preferred embodiment of the present invention.
Figure 6:
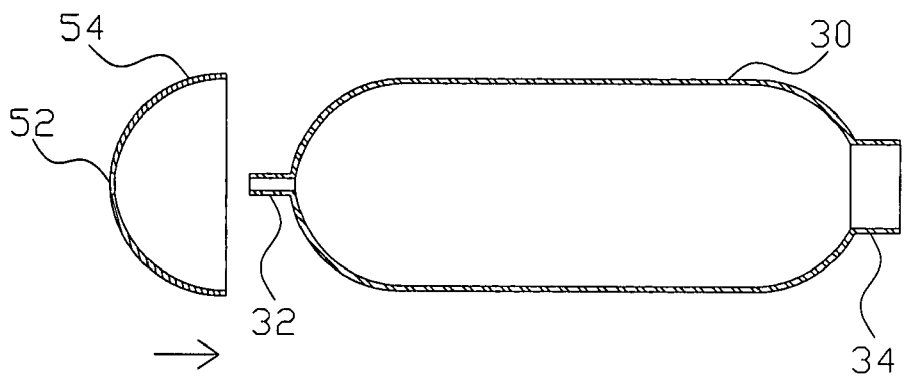
FIG. 6 shows a schematic diagram of an embodiment step according to a preferred embodiment of the present invention.
Figure 7:
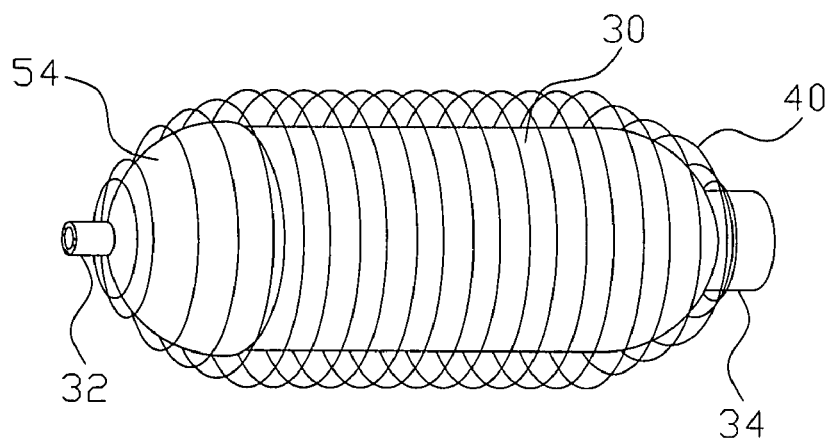
FIG. 7 shows a schematic diagram of an embodiment step according to a preferred embodiment of the present invention.
Figure 8:
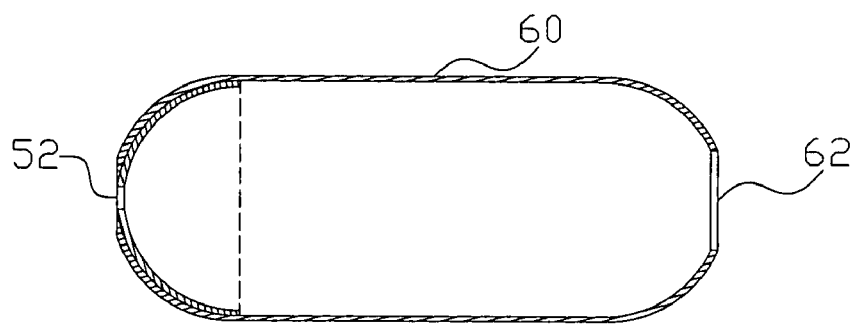
FIG. 8 shows a schematic diagram of an embodiment step according to a preferred embodiment of the present invention.

Next, as shown in FIG. 4, cut the first container 50 into two shells 54 with the first openings 52, which shells 54 are symmetrical or unsymmetrical structures. As shown in FIG. 5, the second substrate 30 is installed onto the filament-winding machine. The winding pattern of the second fibers impregnated with resin 40 is determined according to the shape of the second substrate 30, which is an assemble or a soluble substrate. As shown in FIG. 6, slip one of the shells 54 on the second substrate 30, where one end of the second substrate 30 is a first tube body 32, while the other end of the shell 54 is a second tube body 34. The diameter of the first tube body 32 corresponds to the first opening 52 and is smaller than the second tube body 34. The shell 54 slips on the first tube body 32 through the first opening 52 and is adapted on one end of the second substrate 30. As shown in FIG. 7, the second fibers impregnated with resin 40 are wound on the outer surface of the second substrate 30 and the shell 54 to form a second container 60, wherein the second fibers impregnated with resin 40 are chosen from the group consisting inorganic or organic fibers, such as glass fibers or carbon fibers, or a combination of the above. The impregnation resin is thermoplastic or thermosetting resin. Finally, cure the second container 60. After the second substrate 30 comes off the second container 60, the second container 60 appears like the one shown in FIG. 8. One end of the second container 60 is the first opening 52 of the shell 54, while the other end of the second container 60 is a second opening 62. Besides, the diameter of the first opening 52 is smaller than that of the second opening 62. Thereby, the second container 60 is a wound structure combining the first and the second fibers impregnated with resin 20, 40.

Figure 9:
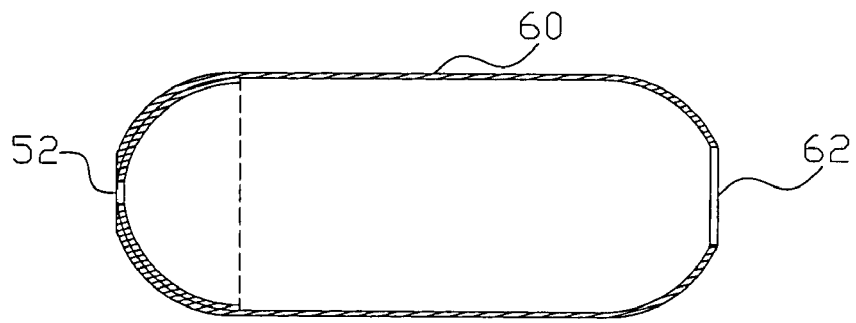
FIG. 9 shows a structural schematic diagram of an embodiment step according to another preferred embodiment of the present invention.

Furthermore, in addition to distinct materials for the first and the second fibers impregnated with resin 20, 40, they can be made of identical materials. Thereby, the second container 60 can include the first and the second fibers impregnated with resin 20, 40 with identical materials, as shown in FIG. 9.

Figure 10:
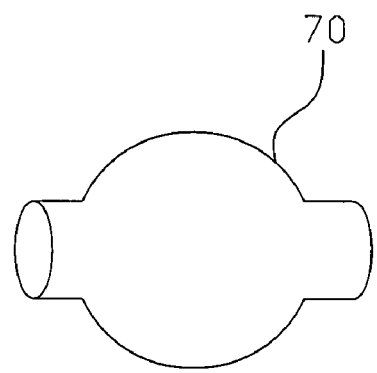
FIG. 10 shows a schematic diagram of an embodiment step according to another preferred embodiment of the present invention.
Figure 11:
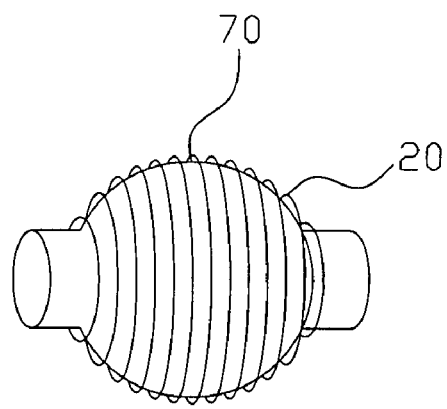
FIG. 11 shows a schematic diagram of an embodiment step according to another preferred embodiment of the present invention.
Figure 12:
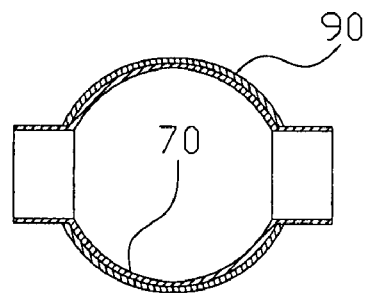
FIG. 12 shows a schematic diagram of an embodiment step according to another preferred embodiment of the present invention.

FIGS. 10 to 17 show schematic diagrams of embodiment steps according to another preferred embodiment of the present invention. As shown in the figures, the manufacturing method according to the present invention uses a filament-winding machine to manufacture a container with different opening sizes on both ends with first fibers impregnated with resin 20 for a third substrate 70, and second fibers impregnated with resin 40 for a fourth substrate 80, wherein the diameter of the opening of the third substrate 70 is greater than that of the fourth substrate 80. As shown in FIG. 10, the third substrate 70 is installed onto the filament-winding machine. The winding pattern of the first fibers impregnated with resin 20 is determined according to the shape of the third substrate 70. As shown in FIG. 11, the first fibers impregnated with resin 20 are wound on the outer surface of the third substrate 70 to form a third container 90, wherein the first fibers impregnated with resin 20 are chosen from the group consisting inorganic or organic fibers, such as glass fibers or carbon fibers, or a combination of the above. The impregnation resin is thermoplastic or thermosetting resin. Then, cure the third container 90 and the cured first container 90 is shown in FIG. 12, wherein third openings 92 are positioned on both ends of the third container 90, respectively.

Figure 13:
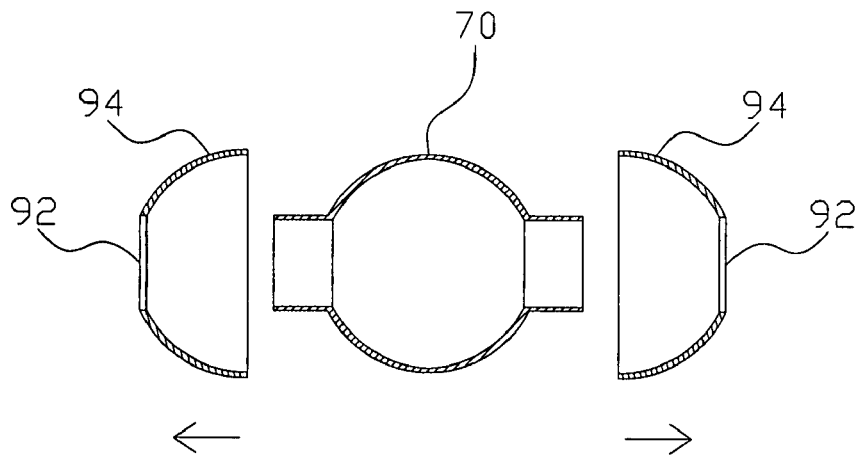
FIG. 13 shows a schematic diagram of an embodiment step according to another preferred embodiment of the present invention.
Figure 14:
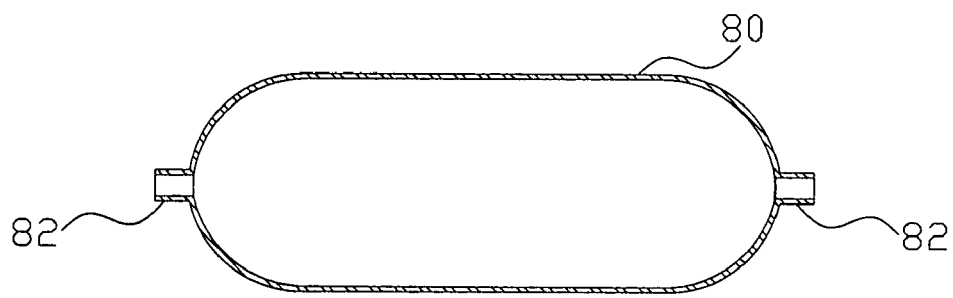
FIG. 14 shows a schematic diagram of an embodiment step according to another preferred embodiment of the present invention.
Figure 15:
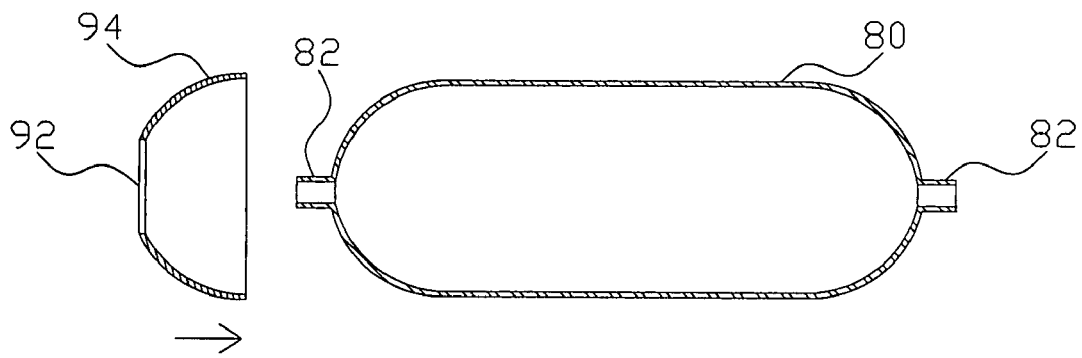
FIG. 15 shows a schematic diagram of an embodiment step according to another preferred embodiment of the present invention.
Figure 16:
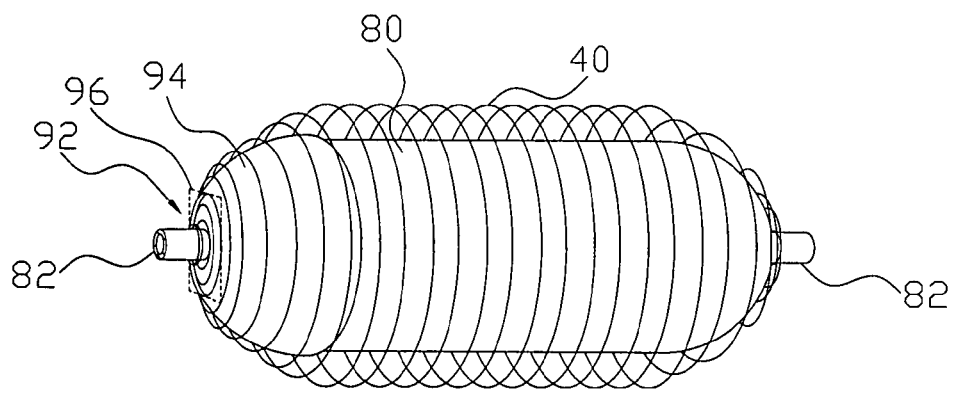
FIG. 16 shows a schematic diagram of an embodiment step according to another preferred embodiment of the present invention.

Next, as shown in FIG. 13, cut the third container 90 into two shells 94 with the third openings 92, which shells 94 are symmetrical or unsymmetrical structures. As shown in FIG. 14, the fourth substrate 80 is installed in the filament-winding machine. The winding pattern of the second fibers impregnated with resin 40 is determined according to the shape of the fourth substrate 80, which is an assemble or a soluble substrate. As shown in FIG. 15, slip one of the shells 94 on the fourth substrate 80, where both ends of the fourth substrate 80 are third tube bodies 82. The diameter of the third tube body 82 corresponds to the third opening 92. As shown in FIG. 16, the second fibers impregnated with resin 40 are wound on the outer side of the fourth substrate 80 and the shell 94 to form a fourth container 100. Because the second fibers impregnated with resin 40 are wound to the periphery of the third tube body 82 and seals the third opening 92, a cutting surface 96 is adapted corresponding to the position of the third opening 92 for attaining the third opening 92. The second fibers impregnated with resin 40 are chosen from the group consisting inorganic or organic fibers, such as glass fibers or carbon fibers, or a combination of the above. The impregnation resin is thermoplastic or thermosetting resin. Finally, cure the fourth container 100. After the fourth substrate 80 comes off the fourth container 100, the fourth container 100 appears like the one shown in FIG. 17. One end of the fourth container 100 is the third opening 92 of the shell 94, while the other end of the fourth container 100 is a fourth opening 102. Besides, the diameter of the third opening 92 is greater than that of the fourth opening 102. Furthermore, according to FIG. 17, the cutting surface 96 is adapted corresponding to the third opening 92.

Figure 17:
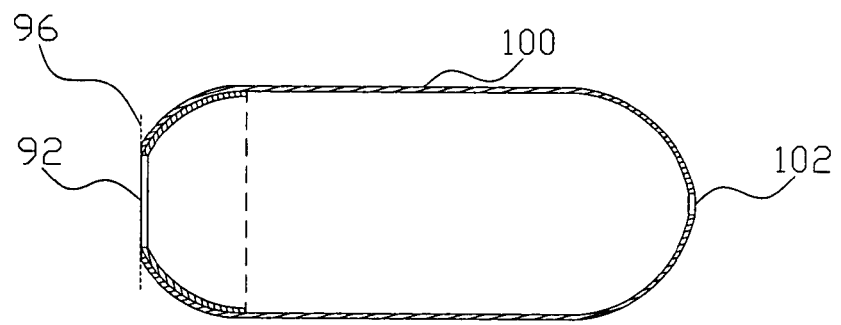
FIG. 17 shows a schematic diagram of an embodiment step according to another preferred embodiment of the present invention.
Figure 18:
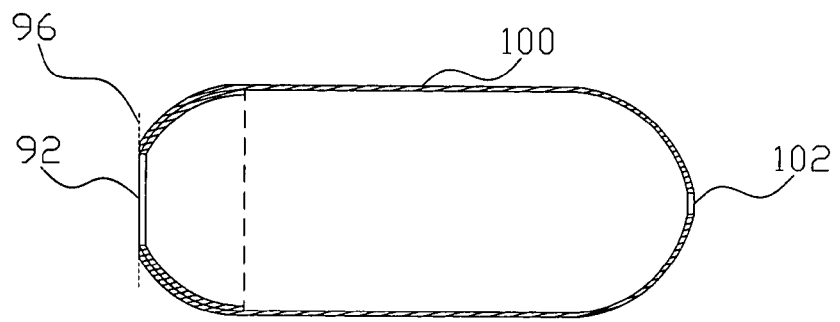
FIG. 18 shows a structural schematic diagram of an embodiment step according to another preferred embodiment of the present invention.

In addition, the structure of the second container 100 can be the one as shown in FIG. 18. The difference between FIG. 17 and FIG. 18 is that the second container 100 in FIG. 17 includes the first and the second fibers impregnated with resin 70, 90 of distinct materials, while the second container 100 in FIG. 18 includes the first and the second fibers impregnated with resin 70, 90 of identical materials. Likewise, the cutting surface 96 is used to attain the third opening 92.

To sum up, the present invention relates to a method for manufacturing containers with different opening sizes on both ends, which uses filament winding for forming a container with distinct opening sizes on both ends. First, a first substrate is installed. Use first fibers impregnated with resin to wind the outer surface of the first substrate for forming a first container with first openings on both ends. Then, cut the first container into two shells with the first openings. In addition, a second substrate is installed and one of the shells is slip on the second substrate. Next, use second fibers impregnated with resin to wind the outer surface of the second substrate and the shell for forming a second container with the first opening and the second opening on both ends, respectively.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A method for manufacturing a composite container with different opening sizes, comprising:

winding the outer surface of a first substrate with first fibers impregnated with resin, for forming a first container with first openings positioned on both ends thereof, respectively;

cutting the first container into two shells with the first opening positioned on one end of each shell, at least a first shell being separated from the first substrate;

slipping the first shell on a second substrate to cap an end portion thereof, the second substrate extending between axial end openings; and winding to cover the outer surface of the second substrate from one axial end opening thereof to the other and overlay the first shell in conformed manner with second fibers impregnated with resin, for forming a second container with the first opening and a second opening positioned on both ends thereof, respectively.

2. The method of claim 1, wherein the diameter of the first opening is smaller or greater than the second opening.

3. The method of claim 1, wherein the material of the first and the second fibers impregnated with resin are chosen from the group consisting of: inorganic or organic fibers, such as glass fibers or carbon fibers, or a combination of the above.

4. The method of claim 1, wherein the resin materials of each of the first and the second fibers impregnated with resin is thermoplastic or thermosetting resin.

5. The method of claim 1, further comprising before the step of winding the outer surface of the first substrate with first fibers impregnated with resin, a step of determining the winding pattern of the first fibers impregnated with resin according to the shape of the first substrate.

6. The method of claim 5, further comprising before the step of determining the winding pattern of the first fibers impregnated with resin according to the shape of the first substrate, a step of installing the first substrate.

7. The method of claim 1, further comprising before the step of winding the outer surface of the second substrate with second fibers impregnated with resin, a step of determining the winding pattern of the second fibers impregnated with resin according to the shape of the second substrate.

8. The method of claim 7, further comprising before the step of determining the winding pattern of the second fibers impregnated with resin according to the shape of the second substrate, a step of installing the second substrate.

9. The method of claim 1, further comprising before the step of cutting the first container into shells with the first opening positioned on one end of each shell, a step of removing at least one shell off the first substrate.

10. The method of claim 1, further comprising after the step of winding the outer surface of the first substrate with first fibers impregnated with resin, a step of curing the first container.

11. The method of claim 1, further comprising after the step of winding the outer surface of the second substrate with second fibers impregnated with resin, a step of curing the second container.

12. The method of claim 11, further comprising after the step of curing the second container, a step of removing at least one second container off the second substrate.

13. The method of claim 1, wherein the second substrate is an assemble or a soluble substrate.

14. The method of claim 1, wherein the diameter of the second substrate is greater or smaller than the diameter of the first substrate.

* * * * *